(12) United States Patent
Karita et al.

(10) Patent No.: US 10,677,110 B2
(45) Date of Patent: Jun. 9, 2020

(54) METHOD AND DEVICE FOR MANUFACTURING METALLIC-SODIUM-FILLED ENGINE VALVE

(71) Applicant: FUJI HOLLOW VALVE INC., Kikugawa-shi, Shizuoka (JP)

(72) Inventors: Takahiro Karita, Tokyo (JP); Yasushi Maeda, Tokyo (JP)

(73) Assignee: FUJI HOLLOW VALVE INC., Kikugawa-Shi (JP)

( * ) Notice: Subject to any disclaimer, the term of this patent is extended or adjusted under 35 U.S.C. 154(b) by 232 days.

(21) Appl. No.: 15/569,606

(22) PCT Filed: Feb. 26, 2016

(86) PCT No.: PCT/JP2016/055748
§ 371 (c)(1),
(2) Date: Oct. 26, 2017

(87) PCT Pub. No.: WO2016/174912
PCT Pub. Date: Nov. 3, 2016

(65) Prior Publication Data
US 2018/0298793 A1 Oct. 18, 2018

(30) Foreign Application Priority Data
Apr. 28, 2015 (JP) ................... 2015-091109

(51) Int. Cl.
*F04B 37/04* (2006.01)
*F01L 3/14* (2006.01)
(Continued)

(52) U.S. Cl.
CPC ............... *F01L 3/14* (2013.01); *B23P 15/002* (2013.01); *F04B 37/04* (2013.01); *H05B 6/101* (2013.01); *F01L 2103/01* (2013.01)

(58) Field of Classification Search
CPC ......... Y10T 29/49405; Y10T 29/49407; Y10T 29/4941; F01L 3/14; F01L 2103/01; B23P 15/002; H05B 6/101; F04B 37/04
See application file for complete search history.

(56) References Cited

U.S. PATENT DOCUMENTS 4,459,949 A   7/1984   Weintz
7,614,440 B2  11/2009  Muramatsu et al.
(Continued)

FOREIGN PATENT DOCUMENTS

CN    1876278 A     12/2006
EP    1 731 245 A2  12/2006
(Continued)

OTHER PUBLICATIONS

Translation of JP2012136979A (Year: 2012).*
(Continued)

*Primary Examiner* — Sarang Afzali
*Assistant Examiner* — Ruth G Hidalgo-Hernandez
(74) *Attorney, Agent, or Firm* — Birch, Stewart, Kolasch & Birch, LLP

(57) ABSTRACT

An umbrella part metallic sodium insertion device for inserting rod-shaped metallic sodium into a hollow part of a hollow valve; a melting device for melting the metallic sodium in the hollow part by inserting a push rod from an opening into the hollow part of the hollow valve, in which the metallic sodium has been inserted by the device, and, while pushing the rod-shaped metallic sodium in the hollow part, heating the umbrella part to a temperature at which the metallic sodium is melted; a stem part cooling device for cooling a stem part of the hollow valve, in which the metallic sodium has been melted by the melting device, to a temperature lower than the temperature at which the metallic sodium is melted; and a stem part metallic sodium insertion
(Continued)

device for inserting rod-shaped metallic sodium into the hollow part which has been cooled by the device.

7 Claims, 13 Drawing Sheets

(51) Int. Cl.
    *B23P 15/00*     (2006.01)
    *H05B 6/10*     (2006.01)

(56) References Cited

U.S. PATENT DOCUMENTS

| | | |
|---|---|---|
| 2005/0274108 A1 | 12/2005 | Schulte et al. |
| 2006/0048503 A1 | 3/2006 | Havers |
| 2007/0215306 A1* | 9/2007 | Muramatsu ............ B22D 17/12 164/113 |
| 2012/0228538 A1* | 9/2012 | Yoshimura ............ B21C 23/183 251/366 |

FOREIGN PATENT DOCUMENTS

| | | |
|---|---|---|
| JP | 3-260309 A | 11/1991 |
| JP | 7-119421 A | 5/1995 |
| JP | 2002-224812 A | 8/2002 |
| JP | 2006-519952 A | 8/2006 |
| JP | 2011-236839 A | 11/2011 |
| JP | 2012-136978 A | 7/2012 |
| JP | 2012-136979 A | 7/2012 |
| JP | 2014-152636 A | 8/2014 |
| WO | WO 2004/073840 A1 | 9/2004 |
| WO | WO 2004/103529 A1 | 12/2004 |
| WO | WO 2012/086315 A1 | 6/2012 |
| WO | WO 2014/122858 A1 | 8/2014 |

OTHER PUBLICATIONS

Office Action issued in corresponding Chinese Application No. 201680024164.5 dated Mar. 20, 2019.
Extended European Search Report dated Dec. 5, 2018 dated in corresponding European Application No. 16786189.7.

\* cited by examiner

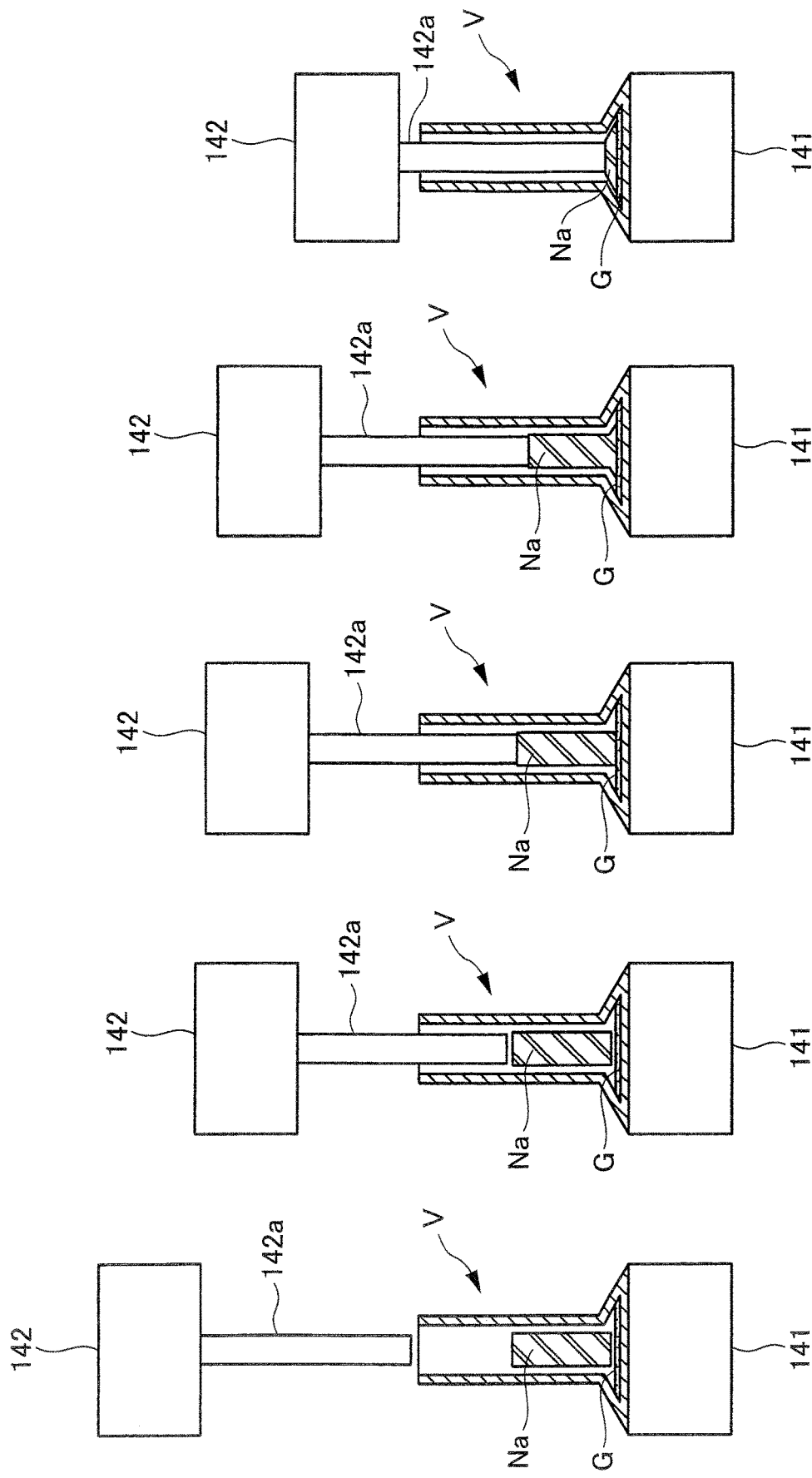

METHOD AND DEVICE FOR MANUFACTURING METALLIC-SODIUM-FILLED ENGINE VALVE

TECHNICAL FIELD

The present invention relates to a method and a device for manufacturing engine valves filled with metallic sodium in their inside.

BACKGROUND ART

In some engine valve for automobiles or the like, a hollow part is provided and filled with metallic sodium to achieve a weight reduction and improve heat transfer efficiency of the engine valve in order for an engine to achieve a high performance, reduction of fuel consumption, or the like.

For such an engine valve, a manufacturing method has been proposed in which the head part is kept at a temperature high enough to melt metallic sodium while wire-shaped metallic sodium is sent into the hollow part through the opening at the upper end of the stem part, so that the metallic sodium is supplied while being liquefied in the hollow part, as described in the following Patent Literature 1, for example.

Besides the above, another manufacturing method has been proposed in which a nozzle is inserted to reach the hollow part of the head part through the opening at the upper end of the stem part, and molten metallic sodium is provided through the nozzle, so that the metallic sodium is injected into the hollow part, as described in the following Patent Literature 2, for example.

CITATION LIST

Patent Literature

Patent Literature 1: Japanese Patent Application Publication No. 2011-236839
Patent Literature 2: Japanese Patent Application Publication No. 2012-136978

SUMMARY OF INVENTION

Technical Problem

However, in the manufacturing method described in the above Patent Literature 1, if the stem part is heated along with heating the head part, the wire-shaped metallic sodium is melted in the hollow part of the stem part and stagnates in the hollow part of the stem part due to the surface tension. Since this makes it difficult to supply the metallic sodium into the hollow part of the head part, the temperature of the stem part needs to be continuously kept below the melting point of metallic sodium during insertion of the metallic sodium. As a result, it takes time and efforts to control the temperature.

In the manufacturing method described in the above Patent Literature 2, in the case where the diameter of the nozzle is reduced corresponding to a stem part with a small diameter, after the injection of molten metallic sodium into the hollow part is repeated several times, the distal end of the nozzle tends to be clogged with the metallic sodium. As a result, the nozzle needs to be cleaned relatively frequently, which takes time and efforts in continuous production.

In view of the above, an object of the present invention is to provide a method and a device for manufacturing metallic-sodium-filled engine valves which facilitate the temperature control while making it possible to produce continuously and efficiently.

Solution to Problem

To solve the above problems, a method for manufacturing a metallic-sodium-filled engine valve according to a first aspect of the invention is a method for manufacturing a metallic-sodium-filled engine valve in which a hollow valve having a hollow part inside a stem part and a head part as well as an opening at an upper end of the stem part is provided thereinside with metallic sodium from the opening of the stem part, and then the opening is closed to fill the metallic sodium in the engine valve, characterized in that the method comprises: a head part metallic sodium insertion step of inserting rod-shaped metallic sodium into the hollow part of the hollow valve; a melting step of melting the metallic sodium in the hollow part by inserting a push rod from the opening into the hollow part of the hollow valve in which the metallic sodium is inserted at the head part metallic sodium insertion step, and by pressing the rod-shaped metallic sodium in the hollow part while heating the head part to a temperature high enough to melt metallic sodium; a stem part cooling step of cooling the stem part of the hollow valve in a state after the metallic sodium is melted at the melting step, to below the temperature high enough to melt the metallic sodium; and a stem part metallic sodium insertion step of inserting rod-shaped metallic sodium into the hollow part of the hollow valve cooled at the stem part cooling step.

In addition, a method for manufacturing a metallic-sodium-filled engine valve according to a second aspect of the invention is the method for manufacturing a metallic-sodium-filled engine valve according to the first aspect of the invention, characterized in that the method further comprises: a getter material adding step of adding getter material into the hollow part of the hollow valve before the metallic sodium is inserted at the head part metallic sodium insertion step.

In addition, a method for manufacturing a metallic-sodium-filled engine valve according to a third aspect of the invention is the method for manufacturing a metallic-sodium-filled engine valve according to the first or second aspect of the invention, characterized in that the head part of the hollow valve is heated by high frequency induction heating at the melting step.

On the other hand, to solve the above problems, a device for manufacturing a metallic-sodium-filled engine valve according to a fourth aspect of the invention is a device for manufacturing a metallic-sodium-filled engine valve in which a hollow valve having a hollow part inside a stem part and a head part as well as an opening at an upper end of the stem part is provided thereinside with metallic sodium from the opening of the stem part, and then the opening is closed to fill the metallic sodium in the engine valve, characterized in that the device comprises: a head part metallic sodium insertion unit that inserts rod-shaped metallic sodium into the hollow part of the hollow valve; a melting unit that melts the metallic sodium in the hollow part by inserting a push rod from the opening into the hollow part of the hollow valve in which the metallic sodium is inserted with the head part metallic sodium insertion unit, and by pressing the rod-shaped metallic sodium in the hollow part while heating the head part to a temperature high enough to melt the metallic sodium; a stem part cooling unit that cools the stem part of the hollow valve in a state after the metallic sodium is melted with the melting unit, to below the temperature high enough to melt the metallic sodium; and a stem part metallic sodium insertion unit that inserts rod-shaped metallic sodium into the hollow part of the hollow valve cooled with the stem part cooling unit.

In addition, a device for manufacturing a metallic-sodium-filled engine valve according to a fifth aspect of the invention is the device for manufacturing a metallic-sodium-filled engine valve according to the fourth aspect of the invention, characterized in that the device further comprises: a getter material adding unit that adds getter material into the hollow part of the hollow valve before the metallic sodium is inserted with the head part metallic sodium insertion unit.

In addition, a device for manufacturing a metallic-sodium-filled engine valve according to a sixth aspect of the invention is the device for manufacturing a metallic-sodium-filled engine valve according to the fourth or fifth aspect of the invention, characterized in that the melting unit includes a heater that heats the head part of the hollow valve with the head part placed thereon so as to support the hollow valve, and a metallic sodium press that is arranged above the heater, and that moves the push rod vertically so as to insert and pull the push rod into and out of the hollow part through the opening of the hollow valve.

In addition, a device for manufacturing a metallic-sodium-filled engine valve according to a seventh aspect of the invention is the device for manufacturing a metallic-sodium-filled engine valve according to the sixth aspect of the invention, characterized in that the heater is a high frequency induction heater.

Advantageous Effects of Invention

In accordance with the method and the device for manufacturing metallic-sodium-filled engine valves according to the present invention, the rod-shaped metallic sodium is inserted into the hollow part of the hollow valve. The push rod is inserted through the opening into the hollow part of the hollow valve to press the rod-shaped metallic sodium in the hollow part while the head part is heated to a temperature high enough to melt metallic sodium, so that the metallic sodium in the hollow part rapidly is melted and put into the head part. Then, after the stem part is cooled to below the temperature high enough to melt metallic sodium, the rod-shaped metallic sodium is inserted into the hollow part of the hollow valve so that the metallic sodium is put into the stem part. As a result, it is natural that there is no need to supply molten metallic sodium through the opening into the hollow part of the hollow valve, and it is possible to put rapidly a target amount of metallic sodium into the head part in the hollow part before the stem part is heated to a high temperature along with the heating of the head part of the hollow valve. Thus, it is possible to facilitate the temperature control while making it possible to produce metallic-sodium-filled engine valves continuously and efficiently.

BRIEF DESCRIPTION OF DRAWINGS

FIG. 13 is a schematic explanatory diagram illustrating a main part of a melting step of the main embodiment of the method for manufacturing metallic-sodium-filled engine valves according to the present invention.

DESCRIPTION OF EMBODIMENTS

Although description will be provided for an embodiment of a method and a device for manufacturing metallic-sodium-filled engine valves according to the present invention based on the drawings, the present invention is not limited only to the embodiment described based on the drawings.

Main Embodiment

Description will be provided for a main embodiment of a method and a device for manufacturing metallic-sodium-filled engine valves according to the present invention based on FIGS. 1 to 17.

Figure 2:
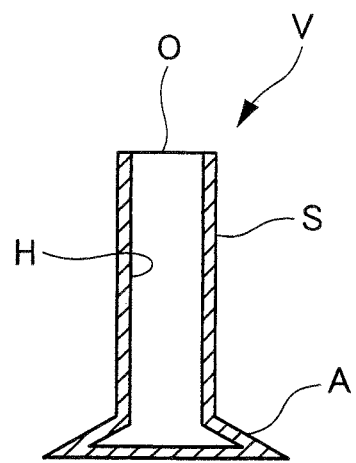
FIG. 2 is a schematic structure diagram of a hollow valve.

First, as illustrated in FIG. 2, a hollow valve to be filled with metallic sodium has a hollow part H inside a stem part S and a head part A as well as an opening O at the upper end of the stem part S. Metallic-sodium-filled engine valves which are filled with metallic sodium Na in its inside can be manufactured by putting metallic sodium Na from the opening O of the stem part S of this hollow valve V into the hollow part H, and then closing the opening O.

Figure 1:
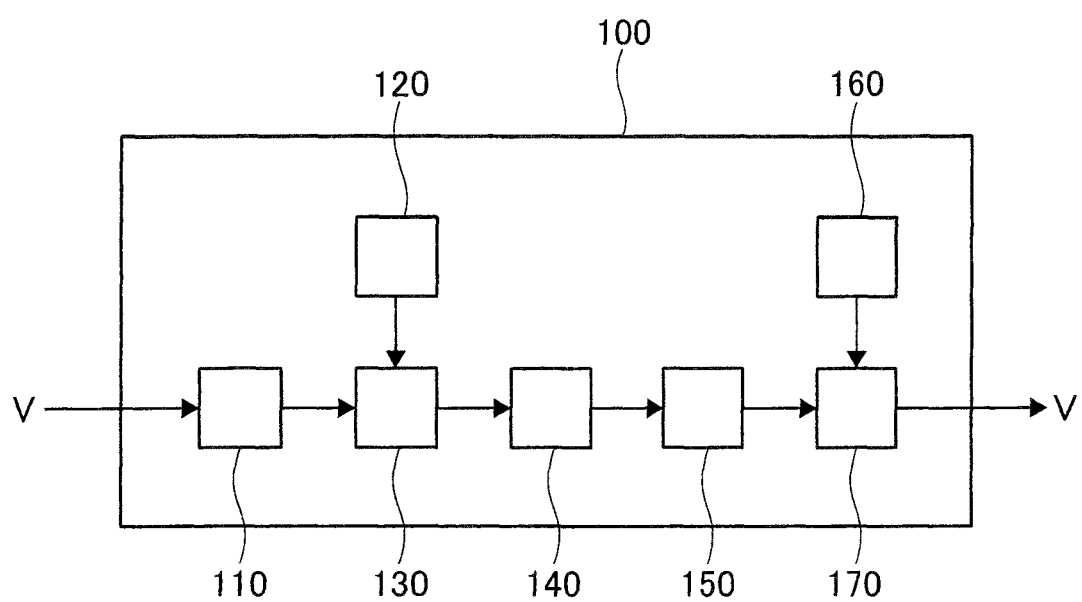
FIG. 1 is a block diagram illustrating a schematic configuration of a main part of a main embodiment of a device for manufacturing metallic-sodium-filled engine valves according to the present invention.

As illustrated in FIG. 1, a manufacturing device according to this embodiment for manufacturing such metallic-sodium-filled engine valves includes: a head part metallic sodium insertion device 130 which is a head part metallic sodium insertion unit that inserts rod-shaped metallic sodium Na into the hollow part H of the hollow valve V; a melting device 140 which is a melting unit that melts the metallic sodium Na in the hollow part H by inserting a push rod from the opening O into the hollow part H of the hollow valve V in which the metallic sodium Na is inserted with the head part metallic sodium insertion device 130, and pressing the rod-shaped metallic sodium Na in the hollow part H while heating the head part A to a temperature high enough to melt the metallic sodium Na; a stem part cooling device 150 which is a stem part cooling unit that cools the stem part S of the hollow valve V in a state after the metallic sodium Na is melted with the melting device 140, to below the temperature high enough to melt the metallic sodium Na; and a stem part metallic sodium insertion device 170 which is a stem part metallic sodium insertion unit that inserts the rod-shaped metallic sodium Na into the hollow part H of the hollow valve V cooled with the stem part cooling device 150, and further includes a getter material adding device 110 which is a getter material adding unit that adds getter material G into the hollow part H of the hollow valve V before the metallic sodium Na is inserted with the head part metallic sodium insertion device 130.

The manufacturing device 100 described above further includes: a head part metallic sodium forming device 120 which is a head part metallic sodium forming unit for forming rod-shaped metallic sodium Na to be inserted into the hollow valve V with the head part metallic sodium insertion device 130; and a stem part metallic sodium forming device 160 which is a stem part metallic sodium forming unit for forming rod-shaped metallic sodium Na to be inserted into the hollow valve V with the stem part metallic sodium insertion device 170.

Figure 3:
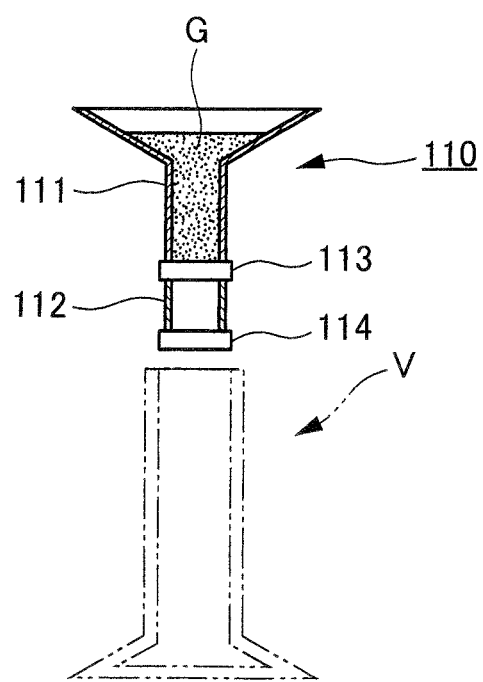
FIG. 3 is a schematic configuration diagram illustrating a main part of a getter material adding device of the manufacturing device in FIG. 1.

As illustrated in FIG. 3, the getter material adding device 110 includes a storage pipe 111 for storing getter material G which is titanium powder or the like, a measuring pipe 112 the upper portion of which is connected to the lower portion of the storage pipe 111 and which measures the getter material G, a first shutter 113 which is openable and closable and provided so as to partition the storage pipe 111 and the measuring pipe 112, and a second shutter 114 which is openable and closable and provided at the lower portion of the measuring pipe 112.

Figure 4:
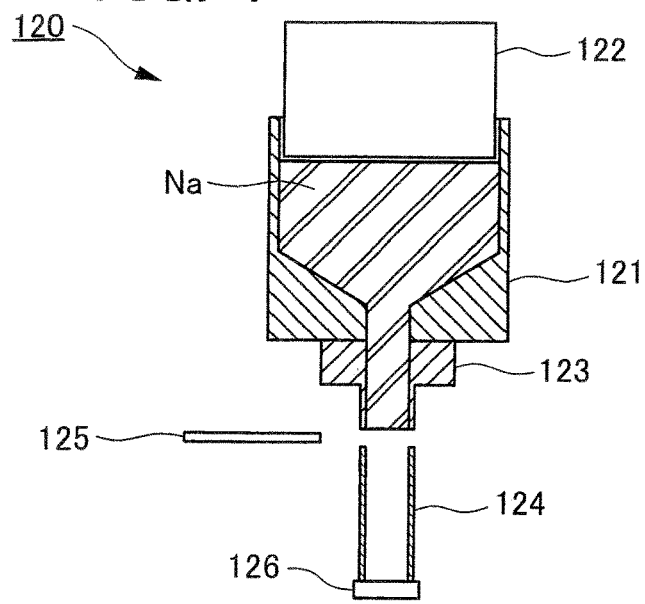
FIG. 4 is a schematic configuration diagram illustrating a main part of a head part metallic sodium forming device of the manufacturing device in FIG. 1.

As illustrated in FIG. 4, the head part metallic sodium forming device 120 includes: an injection cylinder 121, into which block-shaped metallic sodium Na can be put from the proximal end side; a pressing piston 122 which can be moved to-and-fro inside the injection cylinder 121; an injection nozzle 123 which is connected to the distal end of the injection cylinder 121 and injects the block-shaped metallic sodium Na into a rod shape; a measuring pipe 124 which is arranged at the distal end side of the injection nozzle 123 to be movable and measures the rod-shaped metallic sodium Na; a cutter 125 arranged to be capable of moving forward and backward between the distal end of the injection nozzle 123 and the proximal end of the measuring pipe 124; and a shutter 126 which is openable and closable and provided at the distal end of the measuring pipe 124.

Figure 5:
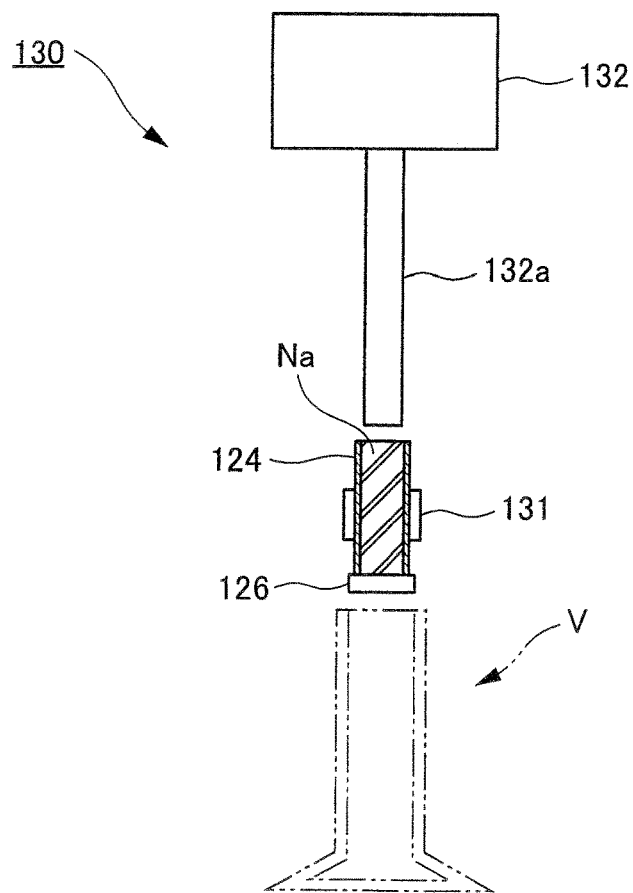
FIG. 5 is a schematic configuration diagram illustrating a main part of a head part metallic sodium insertion device of the manufacturing device in FIG. 1.

As illustrated in FIG. 5, the head part metallic sodium insertion device 130 includes: a measuring pipe moving device 131 which detachably holds the measuring pipe 124 of the head part metallic sodium forming device 120 and moves the measuring pipe 124 and the shutter 126; and an extrusion device 132 which moves an extrusion rod 132a to-and-fro such that the extrusion rod 132a is inserted into and pulled out of the measuring pipe 124.

Figure 6:
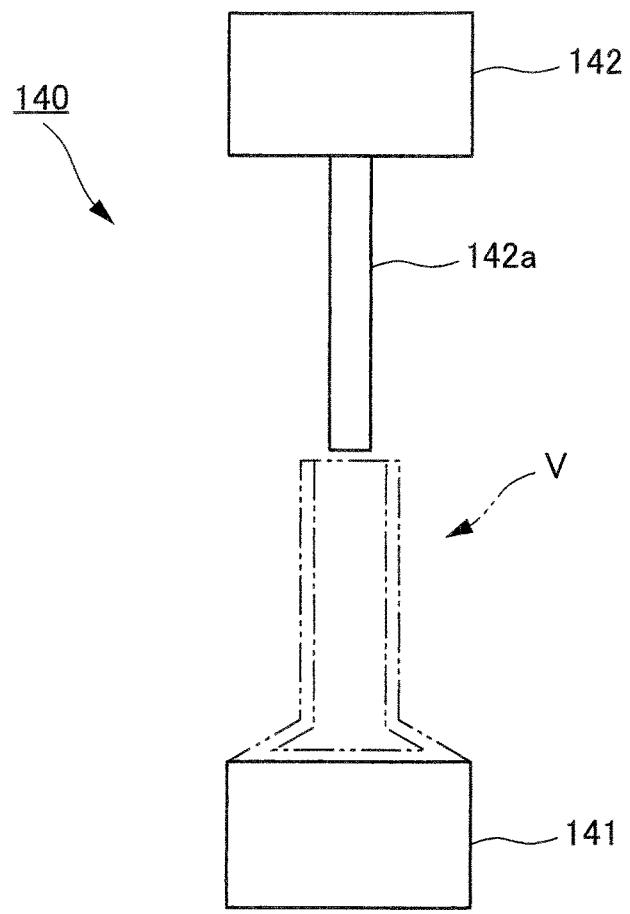
FIG. 6 is a schematic configuration diagram illustrating a main part of a melting device of the manufacturing device in FIG. 1.

As illustrated in FIG. 6, the melting device 140 includes: a high frequency induction heater 141 which is a heater for heating the head part A of the hollow valve V by high frequency induction heating with the head part A placed thereon so as to support the hollow valve V; and a metallic sodium pressing device 142 which is a metallic sodium press which is arranged above the high frequency induction heater 141 and moves a push rod 142a vertically such that the push rod 142a is inserted into and pulled out of the hollow part H through the opening O of the hollow valve V.

Figure 7:
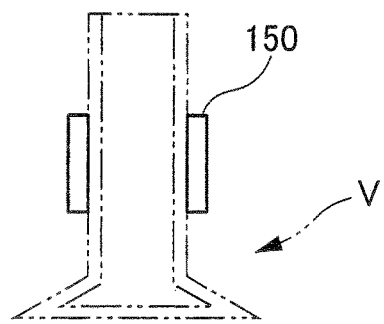
FIG. 7 is a schematic configuration diagram illustrating a main part of a stem part cooling device of the manufacturing device in FIG. 1.

As illustrated in FIG. 7, the stem part cooling device 150 is capable of detachably gripping the stem part S of the hollow valve V to transport the hollow valve V and cooling the stem part S by coolant circulating the inside.

Figure 8:
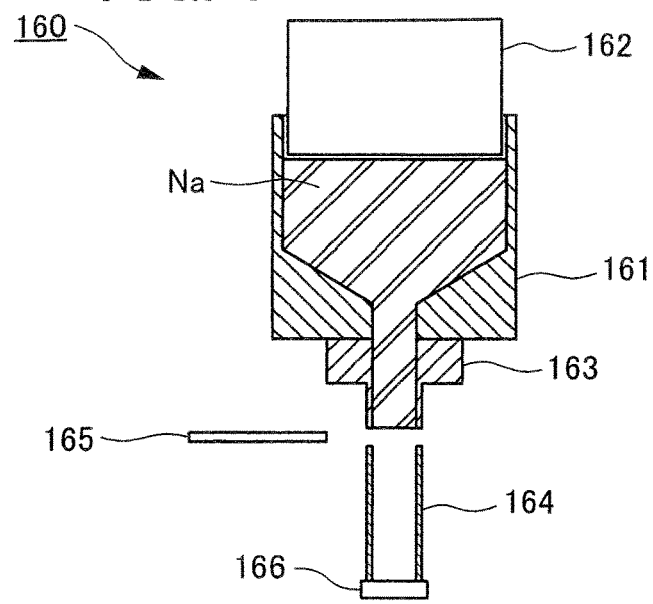
FIG. 8 is a schematic configuration diagram illustrating a main part of a stem part metallic sodium forming device of the manufacturing device in FIG. 1.

As illustrated in FIG. 8, the stem part metallic sodium forming device 160 includes: an injection cylinder 161, into which block-shaped metallic sodium Na can be put from the proximal end side; a pressing piston 162 which can be moved to-and-fro inside the injection cylinder 161; an injection nozzle 163 which is connected to the distal end of the injection cylinder 161 and injects the block-shaped metallic sodium Na into a rod shape; a measuring pipe 164 which is arranged at the distal end side of the injection nozzle 163 to be movable and measures the rod-shaped metallic sodium Na; a cutter 165 arranged to be capable of moving forward and backward between the distal end of the injection nozzle 163 and the proximal end of the measuring pipe 164; and a shutter 166 which is openable and closable and provided at the distal end of the measuring pipe 164.

Figure 9:
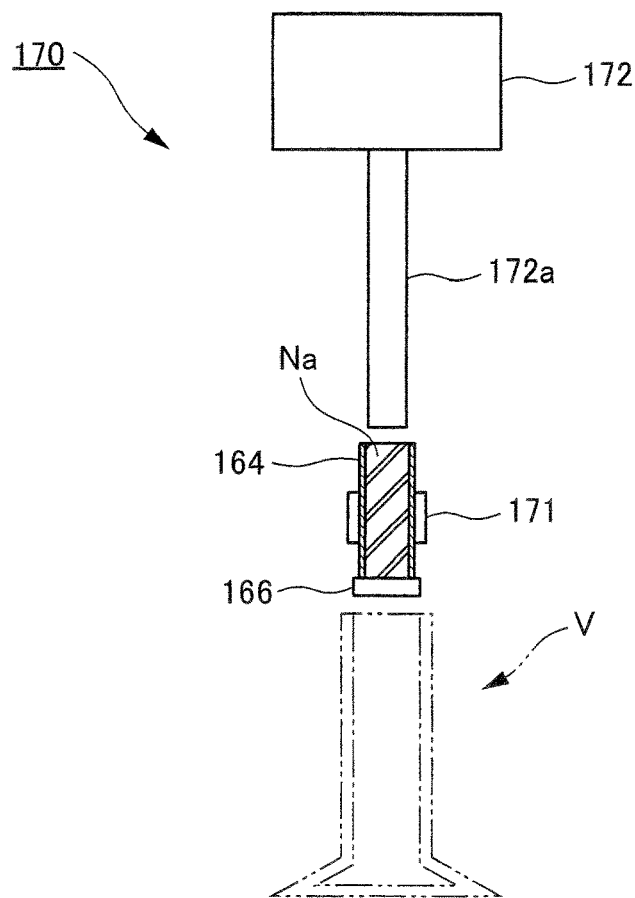
FIG. 9 is a schematic configuration diagram illustrating a main part of a stem part metallic sodium insertion device of the manufacturing device in FIG. 1.

As illustrated in FIG. 9, the head part metallic sodium insertion device 170 includes: a measuring pipe moving device 171 which detachably holds the measuring pipe 164 of the stem part metallic sodium forming device 160 and moves the measuring pipe 164 and the shutter 166; and an extrusion device 172 which moves an extrusion rod 172a to-and-fro such that the extrusion rod 172a is inserted into and pulled out of the measuring pipe 164.

Next, descriptions will be provided for a method for manufacturing metallic-sodium-filled engine valves using the above manufacturing device 100 according to this embodiment.

Figure 10A:
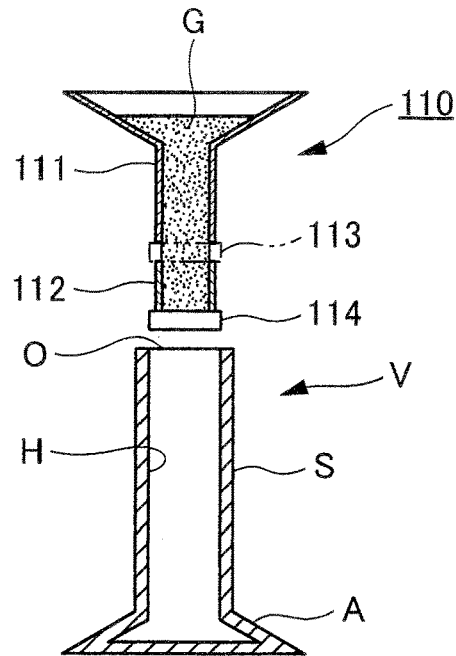
FIG. 10 is a schematic explanatory diagram illustrating a main part of a getter material adding step of a main embodiment of a method for manufacturing metallic-sodium-filled engine valves according to the present invention.

As illustrated in FIG. 10A, the hollow valve V is placed at a specified position in the getter material adding device 110 of the manufacturing device 100. When the second shutter 114 is closed and the first shutter 113 is opened, the getter material Gin the storage pipe 111 is supplied to the measuring pipe 112 to fill the inside of the measuring pipe 112.

Figure 10B:
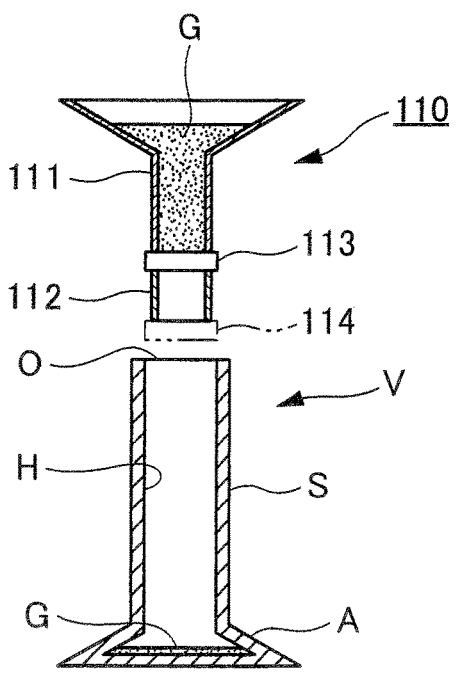

Subsequently, as illustrated in FIG. 10B, when the first shutter 113 is closed and the second shutter 114 is opened, the getter material G in the measuring pipe 112 is added into the hollow part H through the opening O of the hollow valve V (up to this point, a getter material adding step). With this, a specified amount of the getter material G is supplied into the hollow valve V, and the concentration of oxygen in the atmosphere (air) inside the hollow part H is reduced.

Figure 11A:
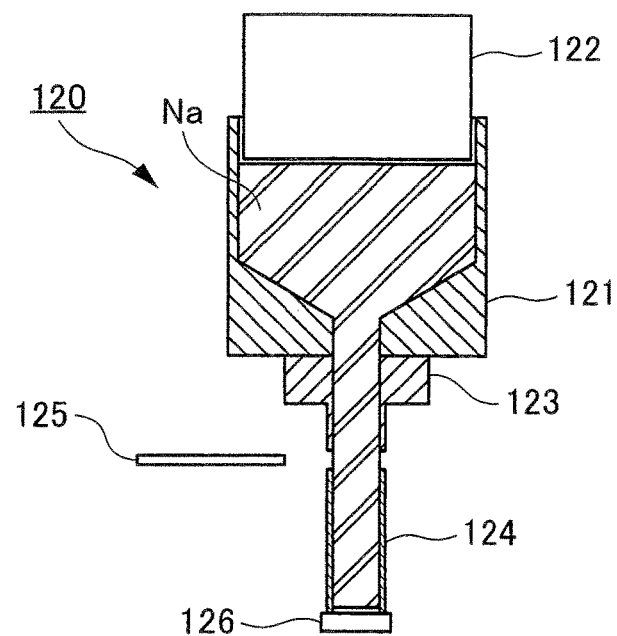
FIG. 11 is a schematic explanatory diagram illustrating a main part of a head part metallic sodium forming step of the main embodiment of the method for manufacturing metallic-sodium-filled engine valves according to the present invention.

As illustrated in FIG. 11A, when the block-shaped metallic sodium Na in the injection cylinder 121 of the head part metallic sodium forming device 120 is pressed by the pressing piston 122, the metallic sodium Na is extruded in a rod shape from the injection nozzle 123 and supplied into the measuring pipe 124.

Figure 11B:
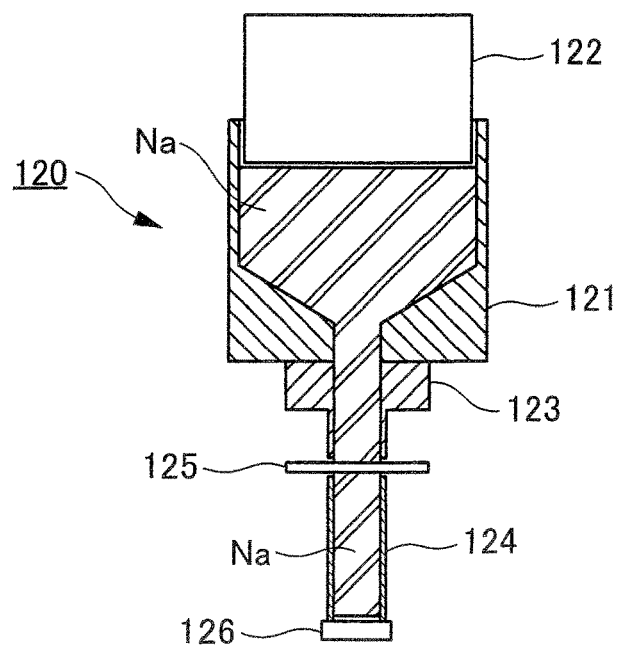

Subsequently, as illustrated in FIG. 11B, by moving in the cutter 125 between the distal end of the injection nozzle 123 and the proximal end of the measuring pipe 124, the metallic sodium Na therebetween is cut, and a specified amount of the metallic sodium Na is formed inside the measuring pipe 124 in a rod shape (up to this point, a head part metallic sodium forming step).

Figure 12A:
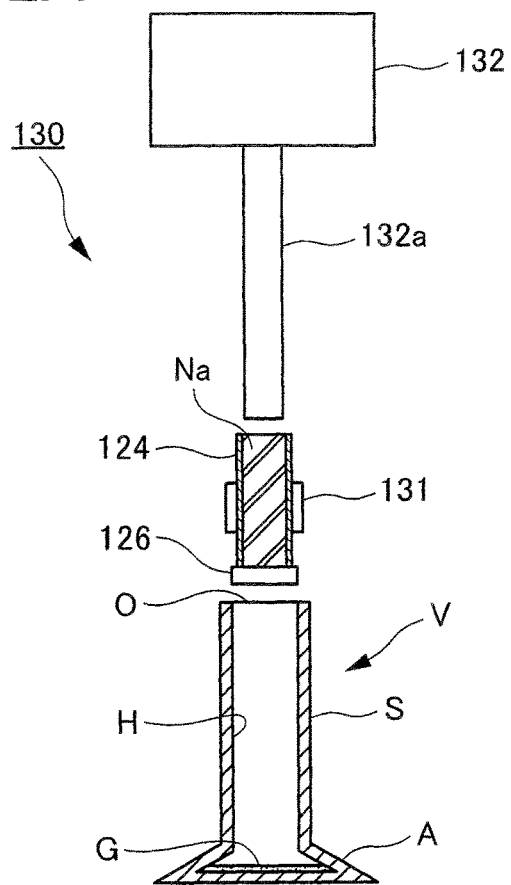
FIG. 12 is a schematic explanatory diagram illustrating a main part of a head part metallic sodium insertion step of the main embodiment of the method for manufacturing metallic-sodium-filled engine valves according to the present invention.

Then, as illustrated in FIG. 12A, the hollow valve V to which the getter material G has been added with the getter material adding device 110 is moved to the head part metallic sodium insertion device 130, while the measuring pipe 124 of the head part metallic sodium forming device 120 is held with the measuring pipe moving device 131 and moved to a specified position in the above head part metallic sodium insertion device 130.

Figure 12B:
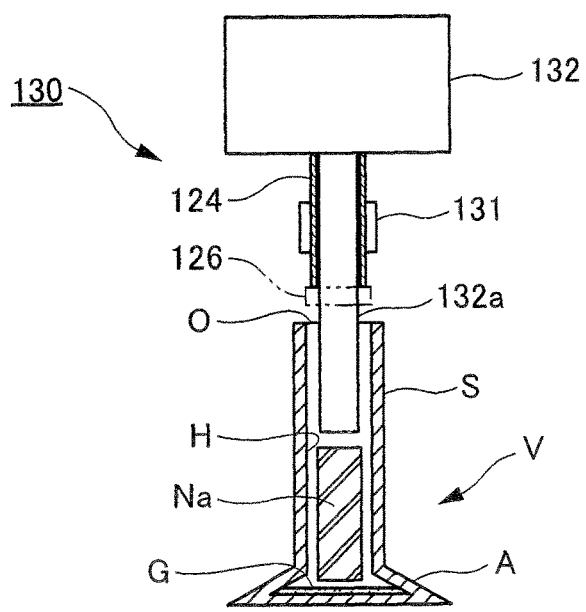

Subsequently, as illustrated in FIG. 12B, after the shutter 126 is opened, by operating the extrusion device 132 to extrude the metallic sodium Na in the measuring pipe 124 with the extrusion rod 132a, a specified amount of the rod-shaped metallic sodium Na is inserted into the hollow part H of the hollow valve V (up to this point, a head part metallic sodium insertion step).

Next, after the hollow valve V into which the specified amount of the rod-shaped metallic sodium Na is inserted with the head part metallic sodium insertion device 130 is moved onto the high frequency induction heater 141 of the melting device 140 as illustrated in FIG. 13A, the metallic sodium pressing device 142 is operated such that the distal end of the push rod 142a comes in contact with the upper end of the rod-shaped metallic sodium Na in the hollow part H of the hollow valve V through the opening O, as illustrated in FIG. 13B.

Subsequently, as illustrated in FIGS. 13C to 13E, the metallic sodium pressing device 142 and the high frequency induction heater 141 are operated such that the rod-shaped metallic sodium Na is pressed with the distal end of the push rod 142a while the head part A of the hollow valve V is heated to a temperature (about 98° C. or more) at which metallic sodium is melted, so that the metallic sodium Na in the hollow part H of the hollow valve V is melted and put into the head part A.

Then, when the push rod 142a of the metallic sodium pressing device 142 is inserted into the hollow part H of the hollow valve V by a specified length, the metallic sodium pressing device 142 is operated to finish pressing the metallic sodium Na with the push rod 142a and pull the push rod 142a out of the hollow part H of the hollow valve V, while the operation of the high frequency induction heater 141 is stopped to stop heating the head part A of the hollow valve V (up to this point, a melting step).

Figure 14:
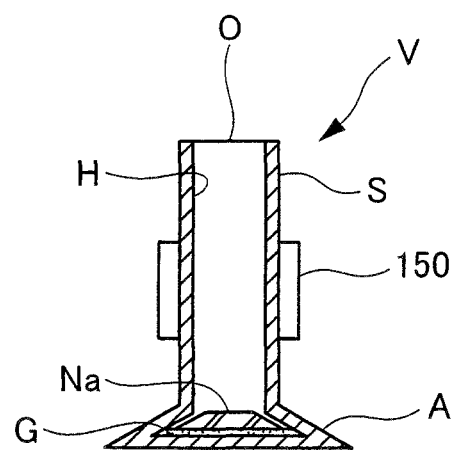
FIG. 14 is a schematic explanatory diagram illustrating a main part of a stem part cooling step of the main embodiment of the method for manufacturing metallic-sodium-filled engine valves according to the present invention.

Next, as illustrated in FIG. 14, by the stem part cooling device 150 holding the stem part S of the hollow valve V in a state after the metallic sodium Na is and put into the head part A with the melting device 140, the stem part S of the hollow valve V is cooled to below the temperature (about 98° C.) at which metallic sodium N is melted while the hollow valve V is moved to a specified position in the stem part metallic sodium insertion device 170 (up to this point, a stem part cooling step).

Figure 15A:
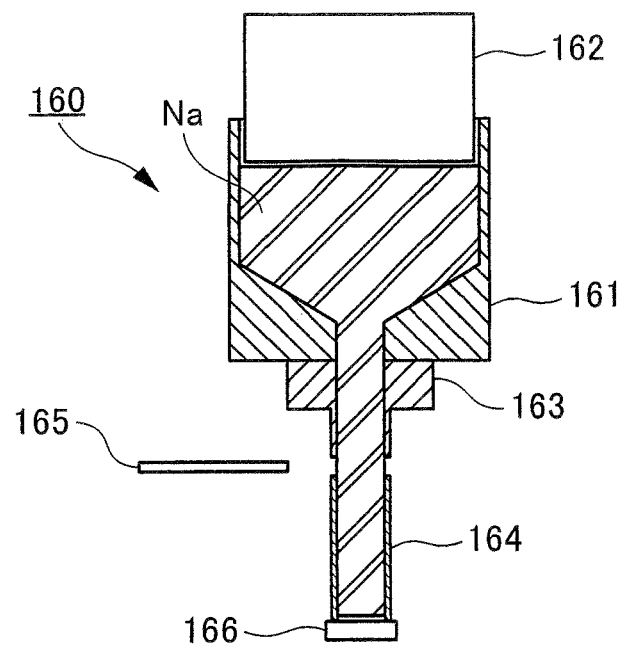
FIG. 15 is a schematic explanatory diagram illustrating a main part of a stem part metallic sodium forming step of the main embodiment of the method for manufacturing metallic-sodium-filled engine valves according to the present invention.

Meanwhile, as illustrated in FIG. 15A, when the block-shaped metallic sodium Na in the injection cylinder 161 of the stem part metallic sodium forming device 160 is pressed with the pressing piston 162, the metallic sodium Na is extruded into a rod shape from the injection nozzle 163 and supplied into the measuring pipe 164.

Figure 15B:
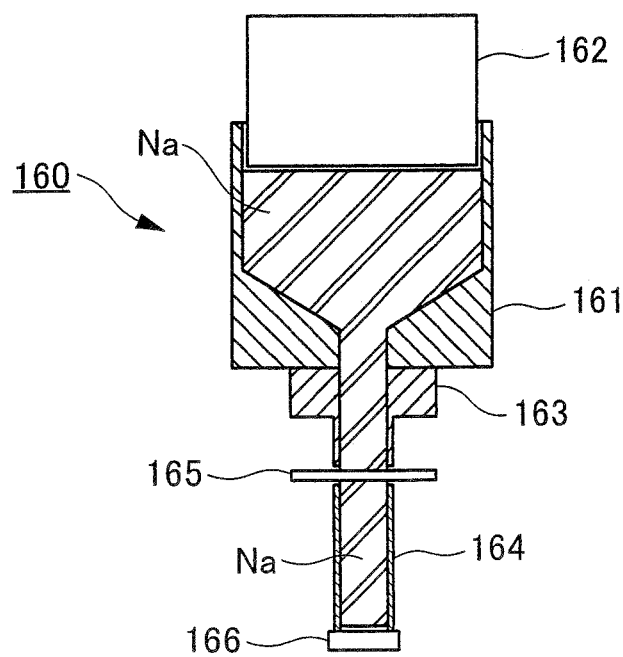

Subsequently, as illustrated in FIG. 15B, by moving in the cutter 165 between the distal end of the injection nozzle 163 and the proximal end of the measuring pipe 164, the metallic sodium Na therebetween is cut, and a specified amount of the metallic sodium Na is formed inside the measuring pipe 164 in a rod shape (up to this point, a stem part metallic sodium forming step).

Figure 16A:
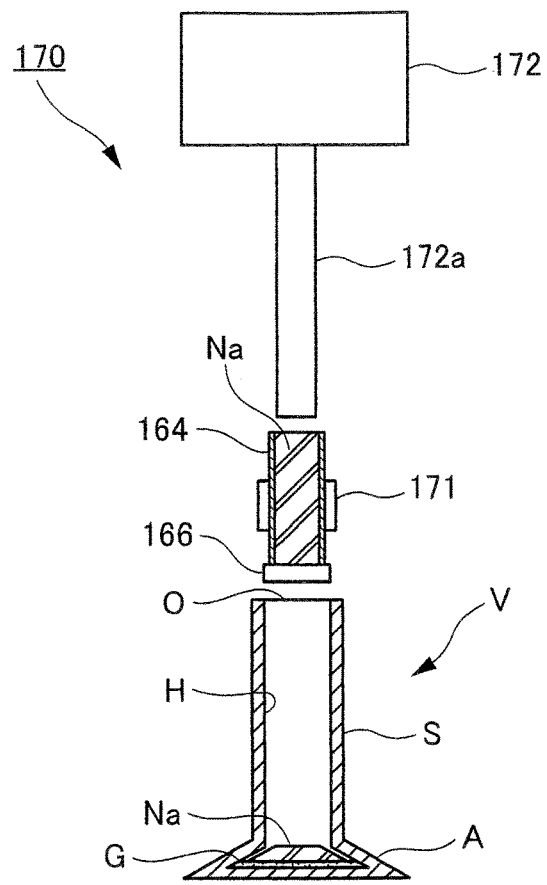
FIG. 16 is a schematic explanatory diagram illustrating a main part of a stem part metallic sodium insertion step of the main embodiment of the method for manufacturing metallic-sodium-filled engine valves according to the present invention.

Then, as illustrated in FIG. 16A, the measuring pipe 164 of the stem part metallic sodium forming device 160 is held with the measuring pipe moving device 171 of the stem part metallic sodium insertion device 170 and moved to a specified position in the stem part metallic sodium insertion device 170.

Figure 16B:
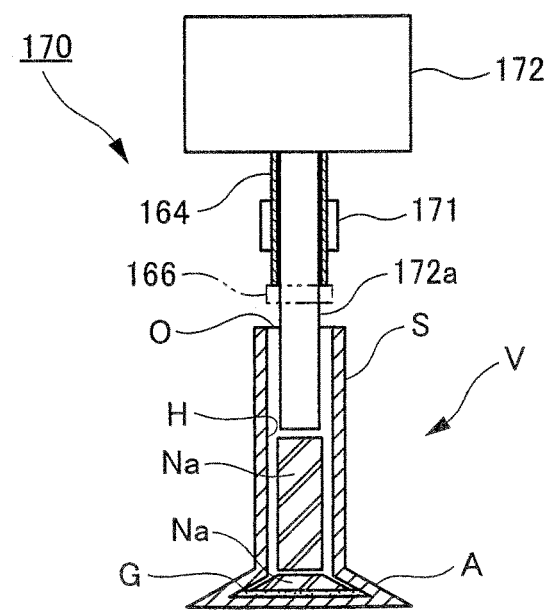
Figure 17:
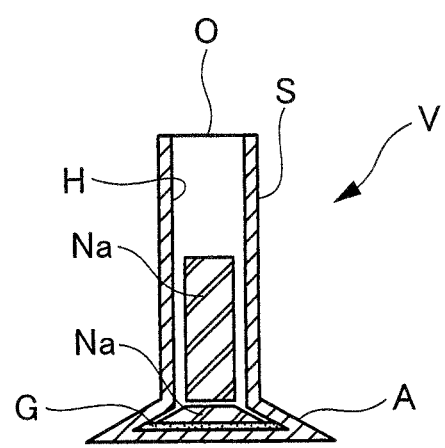
FIG. 17 is a schematic structure diagram illustrating a hollow valve in which metallic sodium is inserted.

Subsequently, as illustrated in FIG. 16B, after the shutter 166 is opened, by operating the extrusion device 172 to extrude the metallic sodium Na in the measuring pipe 164 with the extrusion rod 172a, a specified amount of the rod-shaped metallic sodium Na is inserted into the hollow part H of the hollow valve V (up to this point, a stem part metallic sodium insertion step).

With this, a specified amount of the metallic sodium Na is put into the head part A and the stem part S inside the hollow part H of the hollow valve V. After that, the opening O of the hollow valve V is closed to complete manufacturing the metallic-sodium-filled engine valve.

In summary, in this embodiment, first, the rod-shaped metallic sodium Na is inserted into the hollow part H of the hollow valve V. The push rod 142a is inserted through the opening O into the hollow part H of the hollow valve V to press the rod-shaped metallic sodium Na in the hollow part H while the head part A is heated to a temperature high enough to melt metallic sodium Na, so that the metallic sodium Na in the hollow part H rapidly is melted and put into the head part A. Then, after the stem part S is cooled to below the temperature high enough to melt metallic sodium Na, the rod-shaped metallic sodium Na is inserted into the hollow part H of the hollow valve V, so that the metallic sodium Na is put into the stem part S.

As a result, in this embodiment, it is natural that there is no need to supply molten metallic sodium Na through the opening O into the hollow part H of the hollow valve V, and it is possible to put rapidly a target amount of metallic sodium Na into the head part A in the hollow part H before the stem part S is heated to a high temperature along with the heating of the head part A of the hollow valve V.

Thus, this embodiment facilitates the temperature control while making it possible to produce metallic-sodium-filled engine valves continuously and efficiently.

Other Embodiments

Note that although the rod-shaped metallic sodium Na is inserted after adding the getter material G into the hollow part H of the hollow valve V in the embodiment described above, the addition of the getter material G into the hollow part H of the hollow valve V can be eliminated as another embodiment depending on the conditions such as the oxygen concentration or humidity of the surrounding atmosphere, for example.

In addition, although descriptions were provided in the embodiment described above for the case where the manufacturing device 100 includes the metallic sodium forming devices 120 and 160 for forming the rod-shaped metallic sodium Na, it is possible as another embodiment that the metallic sodium forming devices 120 and 160 are eliminated, and, for example, that rod-shaped metallic sodium Na formed in advance is stored in a container and it is inserted into the hollow part H of the hollow valve V with a metallic sodium insertion unit.

In addition, although in the above embodiment, the head part A of the hollow valve V is heated with the high frequency induction heater 141, it is possible as another embodiment to heat the head part A of the hollow valve V with an electric heater or the like, for example. However, heating the head part A of the hollow valve with the high frequency induction heater 141 makes it easy to heat the head part A quickly and raise its temperature to a target temperature in a short time, and thereby is very suitable for continuous production.

In addition, in the embodiment described above, the stem part cooling device 150, which is capable of detachably holding the stem part S of the hollow valve V to transport the hollow valve V and in which coolant circulates internally, cools the stem part S of the hollow valve V. However, as another embodiment, for example, it is possible to transport the hollow valve V using a conveyor or the like and let the stem part S of the hollow valve V cool, or it is also possible to blow air for air-cooling, in addition. However, the application of the stem part cooling device 150 as in the embodiment described above makes it possible to cool the stem part S of the hollow valve V rapidly, and thereby is very suitable for continuous production.

INDUSTRIAL APPLICABILITY

The method and the device for manufacturing metallic-sodium-filled engine valves according to the present invention facilitates the temperature control while making it possible to produce metallic-sodium-filled engine valves continuously and efficiently, so that they can be utilized extremely advantageously from the industrial viewpoint.

REFERENCE SIGNS LIST 100 manufacturing device
110 getter material adding device
111 storage pipe
112 measuring pipe
113 first shutter
114 second shutter
120 head part metallic sodium forming device
121 injection cylinder
122 pressing piston
123 injection nozzle
124 measuring pipe
125 cutter
126 shutter
130 head part metallic sodium insertion device
131 measuring pipe moving device
132 extrusion device
132a extrusion rod
140 melting device
141 high frequency induction heater
142 metallic sodium pressing device
142a push rod
150 stem part cooling device
160 stem part metallic sodium forming device
161 injection cylinder
162 pressing piston
163 injection nozzle
164 measuring pipe
165 cutter
166 shutter
170 stem part metallic sodium insertion device
171 measuring pipe moving device
172 extrusion device
172a extrusion rod
V hollow valve
A head part
S stem part
H hollow part
O opening
G getter material
Na metallic sodium

The invention claimed is:

1. A method for manufacturing a metallic-sodium-filled engine valve in which a hollow valve having a hollow part inside a stem part and a head part as well as an opening at an upper end of the stem part is provided thereinside with metallic sodium from the opening of the stem part, and then the opening is closed, the method comprising:
a head part metallic sodium insertion step of inserting rod-shaped metallic sodium into the hollow part of the hollow valve;
a melting step of melting the metallic sodium in the hollow part by inserting a push rod from the opening into the hollow part of the hollow valve in which the metallic sodium is inserted at the head part metallic sodium insertion step, and by pressing the rod-shaped metallic sodium in the hollow part while heating the head part to a temperature high enough to melt the metallic sodium, and then stopping heating the head part;
a stem part cooling step of cooling the stem part of the hollow valve in a state after the metallic sodium is melted and heating the head part of the hollow valve is stopped at the melting step, to below the temperature high enough to melt the metallic sodium by using a stem part cooling device that is capable of detachably gripping the stem part of the hollow valve to transport the hollow valve and is capable of cooling the stem part by coolant circulating inside; and
a stem part metallic sodium insertion step of inserting rod-shaped metallic sodium into the hollow part of the hollow valve cooled at the stem part cooling step.

2. The method for manufacturing a metallic-sodium-filled engine valve according to claim 1, further comprising:
a getter material adding step of adding getter material into the hollow part of the hollow valve before the metallic sodium is inserted at the head part metallic sodium insertion step.

3. The method for manufacturing a metallic-sodium-filled engine valve according to claim 1, wherein the head part of the hollow valve is heated by high frequency induction heating at the melting step.

4. A device for manufacturing a metallic-sodium-filled engine valve, for use to perform the method for manufacturing a metallic-sodium-filled engine valve according to claim 1, the device comprising:

a head part metallic sodium insertion unit that inserts rod-shaped metallic sodium into the hollow part of the hollow valve;

a melting unit that melts the metallic sodium in the hollow part by inserting a push rod from the opening into the hollow part of the hollow valve in which the metallic sodium is inserted with the head part metallic sodium insertion unit, and by pressing the rod-shaped metallic sodium in the hollow part while heating the head part to a temperature high enough to melt the metallic sodium;

a stem part cooling unit that cools the stem part of the hollow valve in a state after the metallic sodium is melted and heating the head part of the hollow valve is stopped with the melting unit, to below the temperature high enough to melt the metallic sodium by using a stem part cooling device that is capable of detachably gripping the stem part of the hollow valve to transport the hollow valve and is capable of cooling the stem part by coolant circulating inside; and a stem part metallic sodium insertion unit that inserts rod-shaped metallic sodium into the hollow part of the hollow valve cooled with the stem part cooling unit.

5. The device for manufacturing a metallic-sodium-filled engine valve according to claim 4, wherein the melting unit includes a heater that heats the head part of the hollow valve with the head part placed thereon so as to support the hollow valve, and a metallic sodium press that is arranged above the heater, and that moves the push rod vertically so as to insert and pull the push rod into and out of the hollow part through the opening of the hollow valve.

6. The device for manufacturing a metallic-sodium-filled engine valve according to claim 5, wherein the heater is a high frequency induction heater.

7. The device for manufacturing a metallic-sodium-filled engine valve according to claim 4, further comprising:

a getter material adding unit that adds getter material into the hollow part of the hollow valve before the metallic sodium is inserted with the head part metallic sodium insertion unit.

* * * * *